United States Patent
Sarraiocco

(10) Patent No.: US 10,042,078 B2
(45) Date of Patent: Aug. 7, 2018

(54) SYSTEM AND METHOD FOR VIEWING IMAGES ON A PORTABLE IMAGE VIEWING DEVICE RELATED TO IMAGE SCREENING

(71) Applicant: The United States of America, as Represented by the Secretary, Department of Homeland Security, Washington, DC (US)

(72) Inventor: Brett Sarraiocco, Atlantic City, NJ (US)

(73) Assignee: The United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 14/633,635

(22) Filed: Feb. 27, 2015

(65) Prior Publication Data

US 2016/0252646 A1   Sep. 1, 2016

(51) Int. Cl.
| | |
|---|---|
| *G01V 5/00* | (2006.01) |
| *G06K 9/62* | (2006.01) |
| *G06K 9/00* | (2006.01) |
| *H04N 5/32* | (2006.01) |
| *G06K 9/32* | (2006.01) |
| *G01S 13/88* | (2006.01) |

(52) U.S. Cl.
CPC ....... *G01V 5/0016* (2013.01); *G06K 9/00771* (2013.01); *G06K 9/3233* (2013.01); *G06K 9/6215* (2013.01); *G01S 13/887* (2013.01); *G06K 9/00536* (2013.01); *G06K 9/00577* (2013.01); *G06K 9/3241* (2013.01); *G06K 9/6267* (2013.01); *G06K 2209/09* (2013.01); *H04N 5/32* (2013.01)

(58) Field of Classification Search
CPC ............. G06K 9/00771; G06K 9/3241; G06K 9/6201; G06K 9/6267; G06K 2209/09; G06K 9/00288; G06K 9/00536; G06K 9/228; G06K 9/00577
See application file for complete search history.

(56) References Cited

U.S. PATENT DOCUMENTS

| | | | | |
|---|---|---|---|---|
| 2005/0254619 A1* | 11/2005 | Kamegawa | .......... | G01N 23/046 378/20 |
| 2007/0070037 A1* | 3/2007 | Yoon | ..................... | G06F 1/1626 345/156 |
| 2008/0240578 A1* | 10/2008 | Gudmundson | ...... | G01V 5/0083 382/218 |

(Continued)

*Primary Examiner* — Kenny Cese
(74) *Attorney, Agent, or Firm* — Lavanya Ratnam; Trenton Roche; William Washington

(57) ABSTRACT

An image screening apparatus includes an image scanner that scans an object and generates an image of the object; at least one portable image viewing device; and a controller including circuitry configured to transmit the generated image to the at least one portable image viewing device, trigger display of the transmitted image on a screen of at least one of the portable image viewing devices, and match the displayed image with the scanned object. An area of interest of the scanned object can be displayed on one portable image viewing device by hovering the one portable image viewing device over the area of interest.

23 Claims, 14 Drawing Sheets

(56) References Cited

U.S. PATENT DOCUMENTS

| | | | | |
|---|---|---|---|---|
| 2010/0046704 A1* | 2/2010 | Song | ............... | G01N 23/04 |
| | | | | 378/57 |
| 2010/0092093 A1* | 4/2010 | Akatsuka | ............. | G06K 9/6211 |
| | | | | 382/203 |
| 2013/0034268 A1* | 2/2013 | Perron | ................ | G01V 5/0016 |
| | | | | 382/103 |
| 2014/0285647 A1* | 9/2014 | Okusu | ..................... | H04N 5/33 |
| | | | | 348/77 |
| 2014/0300720 A1* | 10/2014 | Rothberg | ................ | H04N 5/30 |
| | | | | 348/77 |
| 2014/0330928 A1* | 11/2014 | Takehara | ............ | H04L 67/1095 |
| | | | | 709/217 |
| 2014/0363048 A1* | 12/2014 | Vrcelj | ..................... | G06K 9/78 |
| | | | | 382/103 |
| 2016/0335756 A1* | 11/2016 | O'Connor | ............. | G06T 7/0004 |

* cited by examiner

SYSTEM AND METHOD FOR VIEWING IMAGES ON A PORTABLE IMAGE VIEWING DEVICE RELATED TO IMAGE SCREENING

STATEMENT AS TO FEDERALLY SPONSORED RESEARCH

The invention was made with Government support by the U.S. Department of Homeland Security, Science and Technology Directorate, through the Transportation Security Laboratory (TSL). The TSL serves as the lead scientific and technical agent for contraband detection solutions supporting the homeland security enterprise by applying scientific and technical acumen to advance explosives and detection technologies. The facility delivers effective and innovative insight, methods and solutions for the critical needs of the Homeland Security Enterprise by monitoring and creating solutions for rapidly-evolving technological threats.

TECHNICAL FIELD

Embodiments disclosed herein generally relate to image screening and matching.

BACKGROUND

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

In order to maintain safety for public travel, aviation security practices are required for all public air travel modes. Imaging systems have been used for some time as a method for viewing of X-ray and MMW data to search for prohibited items.

An electronic image screening system employs image capturing devices or sensors at viewing stations to collect images. Images are displayed for contemporaneous screening by inspectors and/or recorded for later use. These practices include using X-ray to scan checked baggage and carryon baggage/items for explosives, weapons, and prohibited items. X-ray images are reviewed by personnel from Transportation Security Administration (TSA) or contractors. When potential explosives are identified, Bomb Appraisal Officers (BAOs) are notified and take steps to handle the safety issue. The screenings of checked baggage and checkpoint items use different procedures. Both forms of screenings rely on X-ray images to be displayed in one or multiple locations to review X-ray images during the screening process. However, more viewing stations and image scanners increase the cost of the screening systems. Viewing mechanisms have been thus far located at immobile stations and are not intuitively linked from a viewable image to a physically present luggage item. The portable viewing device invention disclosed herein will allow for linking of luggage items to the on screen software enabled/enhanceable representation of X-ray, MMW or other imaging technology data. This will provide a better correlation between the visual appearance of a physical piece of luggage and the image generated by an imaging system, and will at the same time result in improved detection capabilities, opportunities of efficiencies in work force allocations, and better safety for bomb appraisal situations by offering a targeted inspection where the need to physically work through a piece of luggage to examine the area of concern from an image capture is reduced.

SUMMARY

In an embodiment of the disclosure, there is provided an image screening system including: an image scanner that scans an object and generates an image of the object; at least one portable image viewing device; and a controller including circuitry configured to transmit the generated image to at least one portable image viewing device, to trigger display of the transmitted image on a screen of at least one of the portable image viewing devices, and to match the displayed image with the scanned object.

In another embodiment, there is provided an image matching system including: at least one portable image viewing device; a controller including circuitry configured to transmit an image of an object to at least one portable image viewing device, trigger display of the transmitted image on a screen of at least one of the portable image viewing device and match the displayed image with the object.

In another embodiment, there is provided a method for screening images of an object including: scanning an object and generating an image of the object; transmitting the generated image to at least one portable image viewing device; triggering display of the transmitted image on a screen of at least one of the portable image viewing devices; and matching the displayed image with the scanned object.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages of the invention will be readily obtained through reference to the following detailed description when considered in connection with the accompanying drawings. It should be noted however, that the specific embodiments provided in the Figures below, are not restrictive of the system described, wherein.

DETAILED DESCRIPTION OF THE EMBODIMENTS

Figure 1:
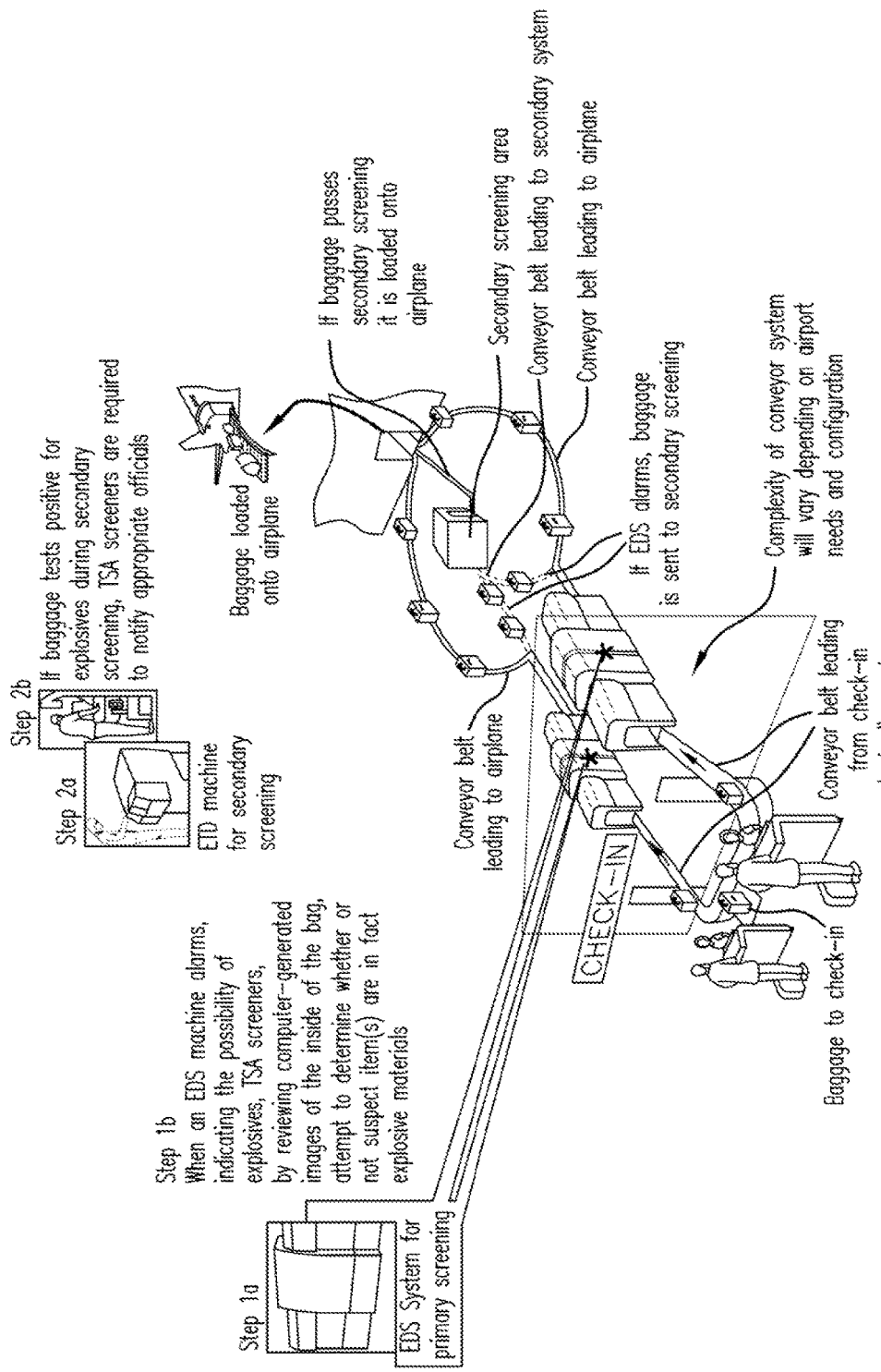
FIG. 1 is an exemplary system diagram of a checked bag inspecting system (CBIS)

In the drawings, like reference numerals designate identical or corresponding parts throughout the several views. Further, as used herein, the words "a," "an" and the like generally carry a meaning of "one or more," unless stated otherwise. The drawings are generally not drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween to the specified value.

A checked baggage inspection system (CBIS) is shown in FIG. 1. Typically, baggage is checked by passengers after ticketing and prior to passing through a security checkpoint. The checked bags are scanned by an Explosives Detection System (EDS) using a Computed Tomography (CT) X-ray. The EDS measures relative density in a single energy mode, and measures density plus effective nuclear charge ($Z_{eff}$) atomic number in a dual energy mode. Images are displayed on one or multiple viewing stations and may include 2D projections scans, individual scans of different slices of the object, or 3D/rotatable representations of the object. After the passengers check their baggage, the bags can be scanned by either a stand-alone EDS or an automated system.

Figure 2:
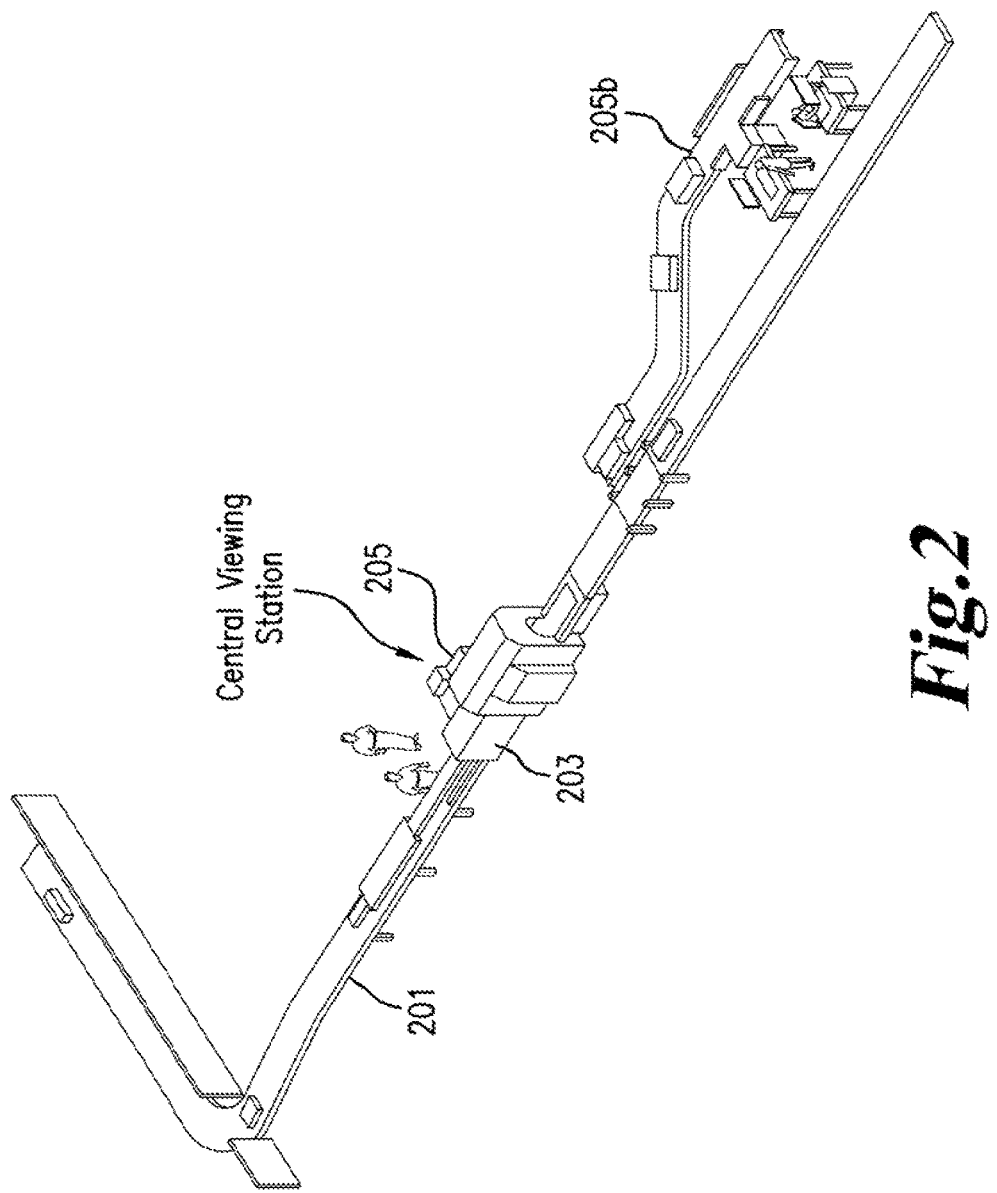
FIG. 2 is an exemplary diagram of an automated CBIS.
Figure 3:
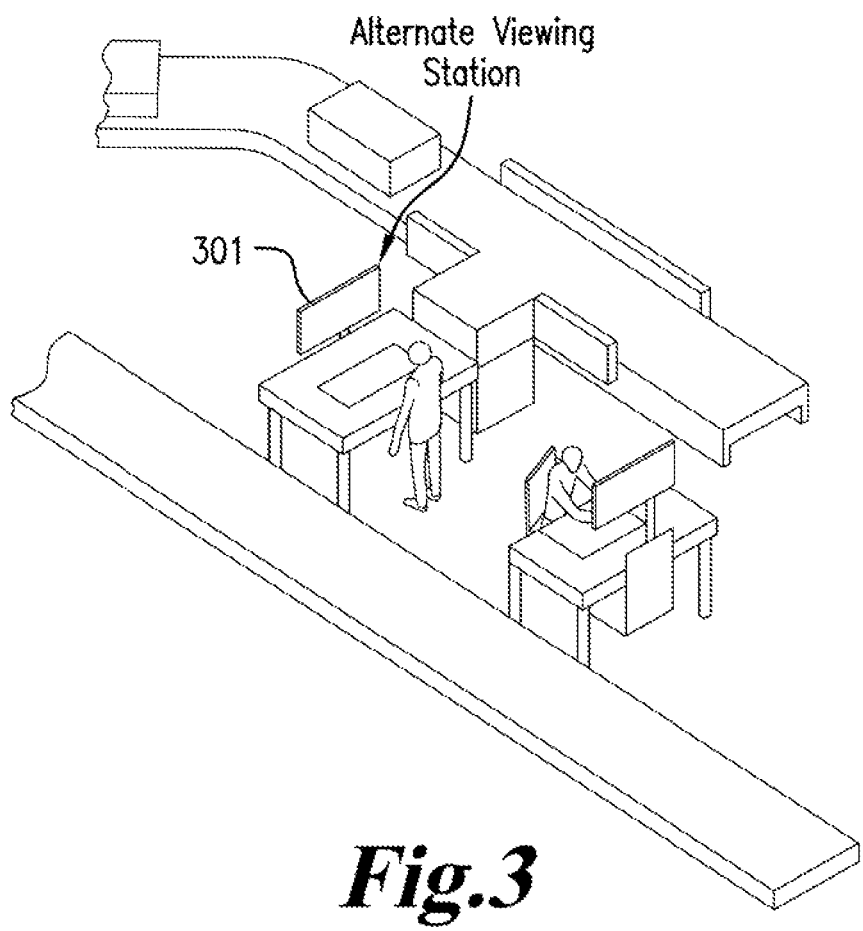
FIG. 3 is an exemplary diagram of a secondary screening area.

FIG. 2 is an exemplary illustration of the automated system. As shown in FIG. 2, the bags are placed into a series of conveyors 201, known as a Baggage Handling System (BHS). The items are transported to the EDS 203 for scanning. Each image from the EDS is viewed by an operator at a viewing station 205. The viewing station 205 is located either immediately next to the EDS 203 or in a remote viewing area. Based on SOPs, images are determined to be either cleared or suspected. Cleared items are transmitted through the BHS and eventually loaded onto an airplane. Suspected bags are transported to a secondary screening area, where explosives trace detection (ETD) and/or manual searching is performed. The EDS image is transmitted to an alternate viewing station 301, located at the secondary screening area as shown in FIG. 3, to aid in searches by a Security Officer (SO). The SO uses this image to locate the threat and perform secondary screening. In extreme situations, BAOs, Bomb Squads, or other threat mitigation experts, may also look at the corresponding EDS image.

Figure 4:
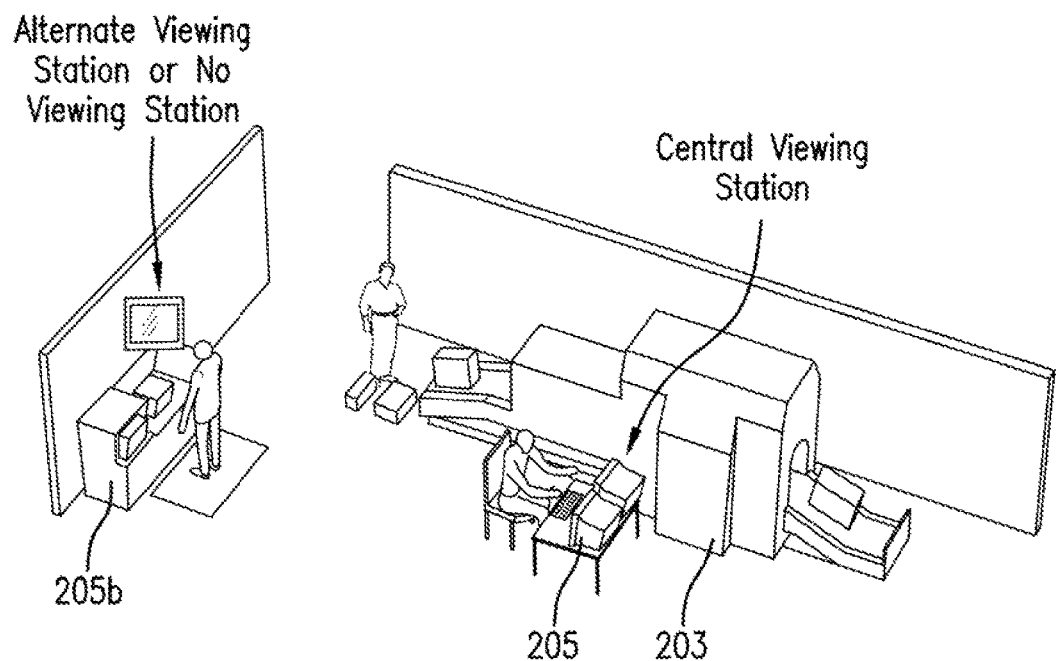
FIG. 4 is an exemplary diagram of a stand-alone explosive detection system.

For stand-alone scans as shown in FIG. 4, the checked bag is manually loaded and unloaded to the EDS 203. Images are displayed at a viewing station 205 located next to the EDS. Again, images are either cleared or deemed suspect and sent to secondary screening as appropriate. These images are viewed at the EDS 203 and potentially at an alternate viewing station 205b located at the secondary screening area. In most cases, there are no alternate viewing stations located in a stand-alone set-up. In extreme situations, BAOs, Bomb Squads, or other officials, may look at the corresponding EDS image at the viewing station, in order to help identify and mitigate the threat.

Figure 5:
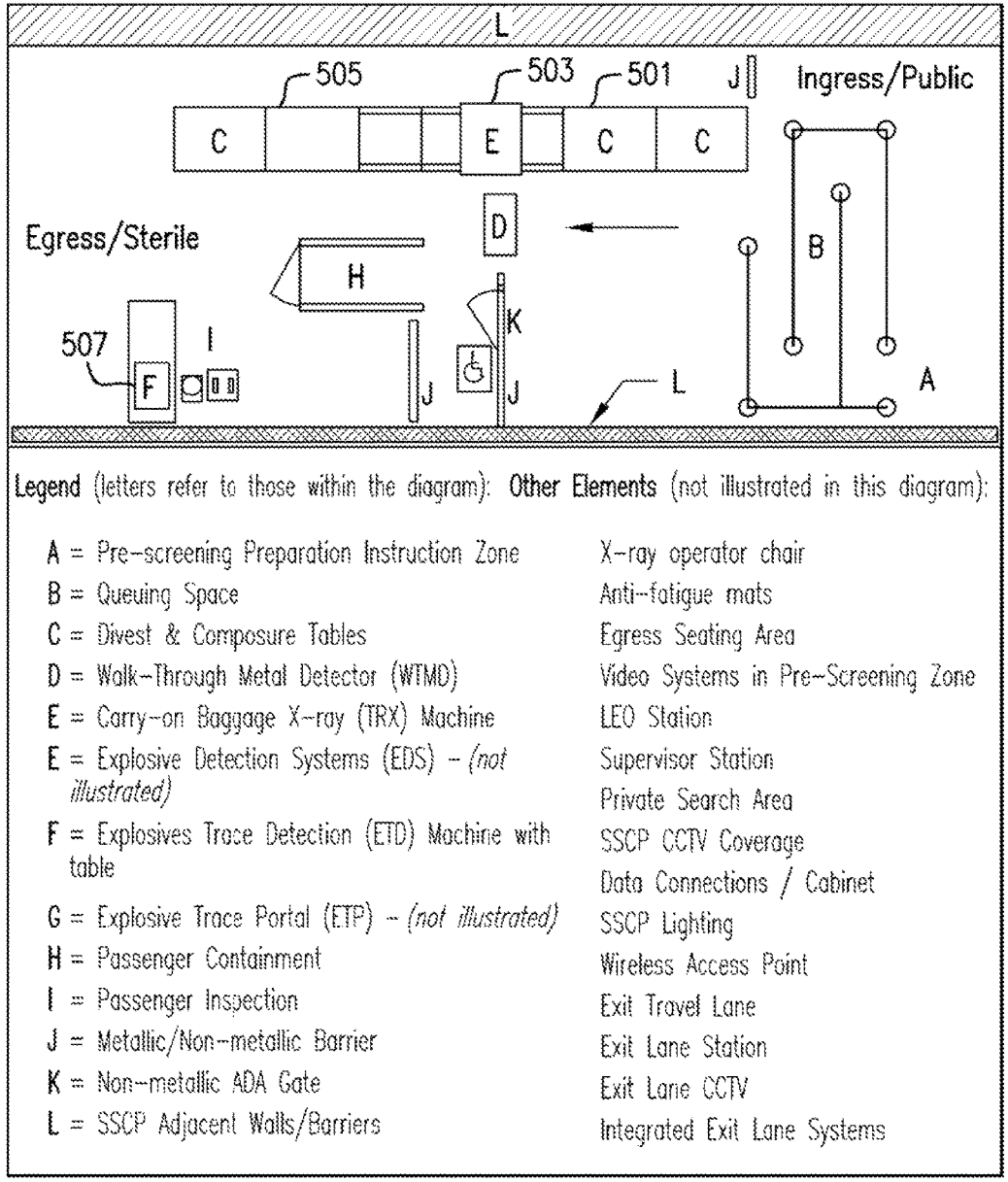
FIG. 5 is an exemplary diagram of a typical checkpoint layout.

A checkpoint has two main subjects to screen: the passenger and canyon items (COI). An example of a checkpoint is shown in FIG. 5. Screening of the passenger encompasses a blend of walk through screening, such as provided by an enhanced walk through metal detector (WTMD) or Advanced Imaging Technology (AIT), and secondary searches such as providing a physical pat-down. The pat-down is typically performed by manually checking the passenger's clothing in order to search for concealed items such as weapons or illegal drugs.

The COIs are inspected according to ISA divestment rules. There are also other prohibited items, such as guns and knives.

At a standard checkpoint, the passenger arrives with his COIs, and shows at least one SO his ID and boarding pass. The passenger then proceeds to the X-ray infeed conveyor 501. The passenger's shoes are removed and placed in a bin. Laptops are also placed in a bin. Other items are either placed in a bin or directly on the infeed conveyor 501. The passenger is screened through WTMD, AIT, and/or pat down. The COIs are typically screened by an X-ray based image scanner 503.

When the COI proceeds through the image scanner 503, an X-ray image is generated by the image scanner and is viewed by the SO. A determination about whether the item is suspect or non-threat (clear) is made. If the item is determined to be clear, it proceeds to the out-feed conveyor 505 and is collected by the passenger. If the item is suspected to contain a prohibited item or to be explosive, the item is sent to another SO at a secondary screening area 507. In extreme situations, BAOs, Bomb Squads, or other officials, may look at the corresponding X-ray image at the viewing station, in order to help identify and mitigate the threat.

The secondary screening area may use a combination of ETD, Bottle Liquid Screening (BLS), and/or physical search. An alternate viewing station (AVS) of the X-ray image may be used to guide the SO in the secondary screening. The image displayed at the alternate viewing station may include explosives detection bounding boxes and/or an annotation box, which identifies an area of interest and is placed on the image by the X-ray operator.

Four types of X-ray scanners are currently used at airport checkpoints. The first type is a threat image projection (TIP) enabled X-ray (TRX) scanner. The TIP X-ray scanners are dual energy systems which display projection images of COI on one or two screens, of at least one view of the COI. When there is one screen, a top down projection of the COI is displayed by the scanner. When there are two screens, a top down and side view of the COI are displayed by the scanner. TRX systems include a viewing station located close to the main body of the TRX. Images scanned by the TRX systems are pseudo colored images based on density/$Z_{eff}$. The scanned images may or may not include automated explosives detection, which identifies the explosives as bounding boxes on the scanned image. TRX systems are usually not provided at the alternate viewing station.

Advanced Technology (AT) X-ray scanner is an improved version of TRX. The AT scanners are dual energy systems which display a projection image on one or two screens, of each view of the COI. Currently fielded systems display two views of the COI, though there may be more. The two views are nominally orthogonal to each other. A top down and a side view of the COI are displayed on the two screens, respectively. AT X-ray scanners typically include a viewing station located close to the main body of the AT. The scanned images are pseudo colored based on density/$Z_{eff}$ and include automated explosives detection, which displays the explosives suspicious objects as bounding boxes on the X-ray image. AT systems may include an alternate viewing station. AT2 systems are identical to AT systems, but provide improved performance.

A non-x-ray screening technology can also be utilized as the image scanner. For example, a millimeter wave (MMW) based whole body image scanner can be used to screen passengers for metallic and nonmetallic threats, including weapons and explosives, which may be concealed under clothing. The MMW scanner can detect objects underneath the clothes because clothing and many other materials are translucent in some EHF (MMW) radio frequency bands. With active scanners, the MMW is transmitted from antennas simultaneously as the antennas rotate around the body. The wave energy reflected back from the body or other objects on the body is used to construct a three-dimensional image, which is displayed on a remote monitor for analysis.

Auto-EDS systems are CT-based and may be single or dual energy. Generated images include a 3D representation of the COI, selectable image slices, and may include a photograph (electronic file containing an image in the visual spectrum) of the COI as the COI enters a scanning tunnel. These systems may also include automated explosives detection and an alternate viewing station.

This disclosure offers a method and a system of viewing scanned images from X-ray, CT, MMW or other radiation based screening technology, including but not limited to images obtained from EDS, AIT, AT or TRX systems by enabling an image displayed on a portable viewing device to item tracking/visualization, and additional image processing functions. The disclosed methods and systems further enhance the capabilities of aviation security, and other image screening system. However, it should be understood that the method and system described herein are applicable to an image screening system whereby a patient or person is screened for anomaly in place of a bag or baggage, for medical purposes.

Figure 6:
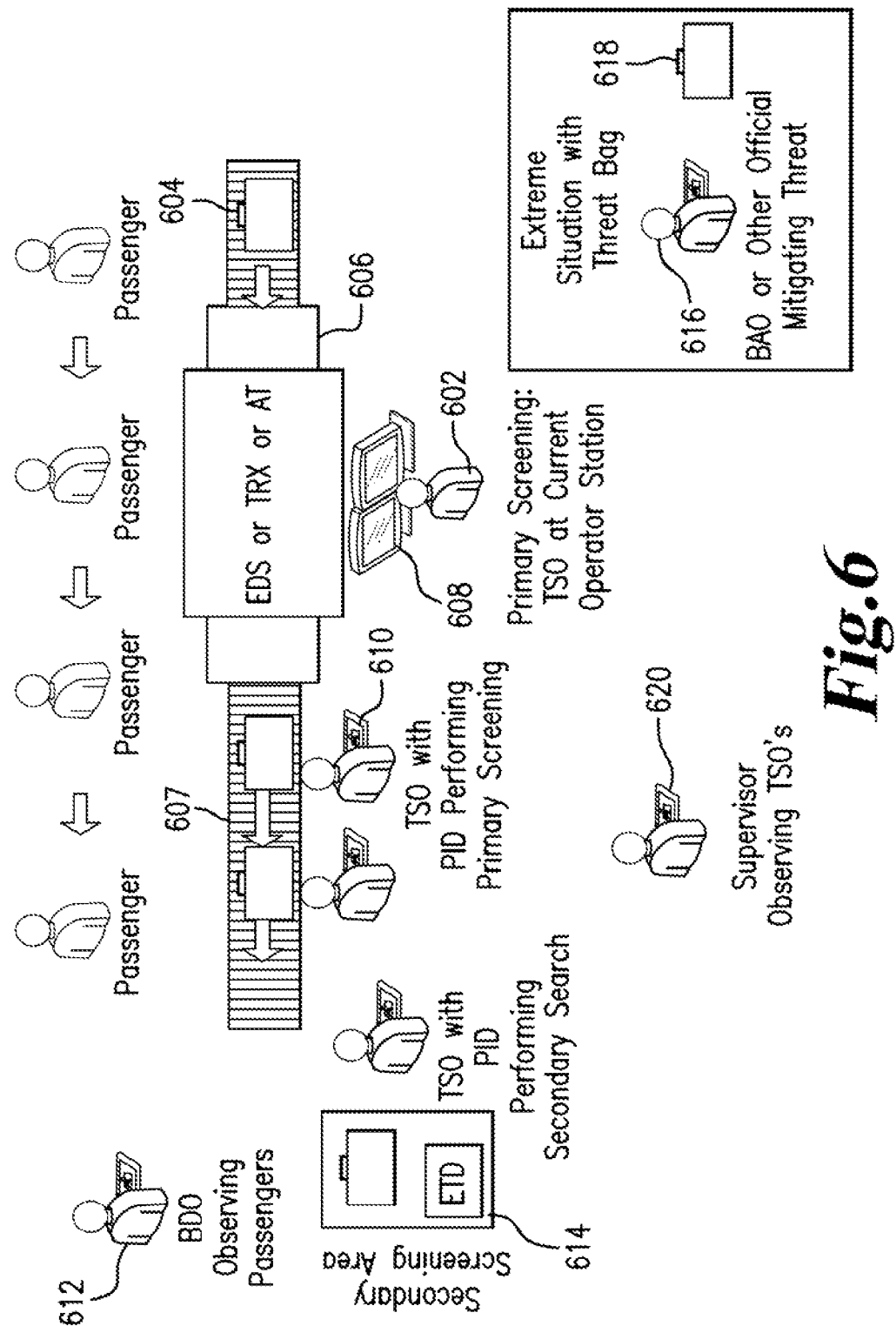
FIG. 6 is an exemplary diagram of a portable image viewing system.

The disclosed systems and methods can be used in three primary areas in aviation security: the primary screening, the secondary screening, and threat mitigation assistance. FIG. 6 is an exemplary illustration of a method of using a Portable Image Viewing (PIV) system and method according to an embodiment of the disclosure. The system and method of viewing can be used in place of the primary screening for baggage scans. The bag 604 is scanned by the TRX, AT or EDS types of scanner when it is passing through the scanning tunnel 606, and then left the scanning tunnel 606 through an exit conveyor 607. The primary scan can be performed either by the SO 602 at the current-existed operator station 608, or by the SO with a Portable Image Device (PID) 610. At checkpoints, Behavior Detection Officers (BDO) 612 can also carry the PID 610 to randomly screen passenger baggage to influence behavior based speculations. Supervisors 620 may also be able to supervise in real time the SO 602 by also viewing images which are currently being screened by the SO 602.

The SO 602 can also use PID 610 for the secondary screening 614. The PID 610 can replace the AVS that was used to guide the SO 602 in the secondary screening 614, or provide an extra viewing screen where there is no viewing image before.

In situations requiring a secondary inspection or in extreme situations where the BAOs 616 or other officials, such as bomb squads, are called to investigate a suspect item 618, the officials can use the PID 610 to compare the visual appearance of the suspect bag with the scanned image of the suspect bag 618, without opening the bag. This side-by side comparison of the scanned imagery and the visual appearance of the suspect bag will enable the investigation official to identify irregularities in the visual appearance of the bag in the image area of interest that may not be visible on the scanner image. By way of example, such irregularities that may not be visible on the scanner image can be in the seam stitching or discoloration of the bag.

In other situations, the disclosed PIV system and method can be used to view the image scan of items or the image scans of passengers when the items are not located at the Checkpoint or CBIS. For example, law enforcement officers may want to view the scanned image of a passenger's carryon bag, at the boarding gate based on tip-off information. In another example, the PIV system can be used to view photographs of each item in the cargo compartment of a plane to search for lost luggage. In another example, the PIV system can be used to view photographs of scanned items without requiring the SO to be physically present at the point of image capture and inspection.

Figure 7:
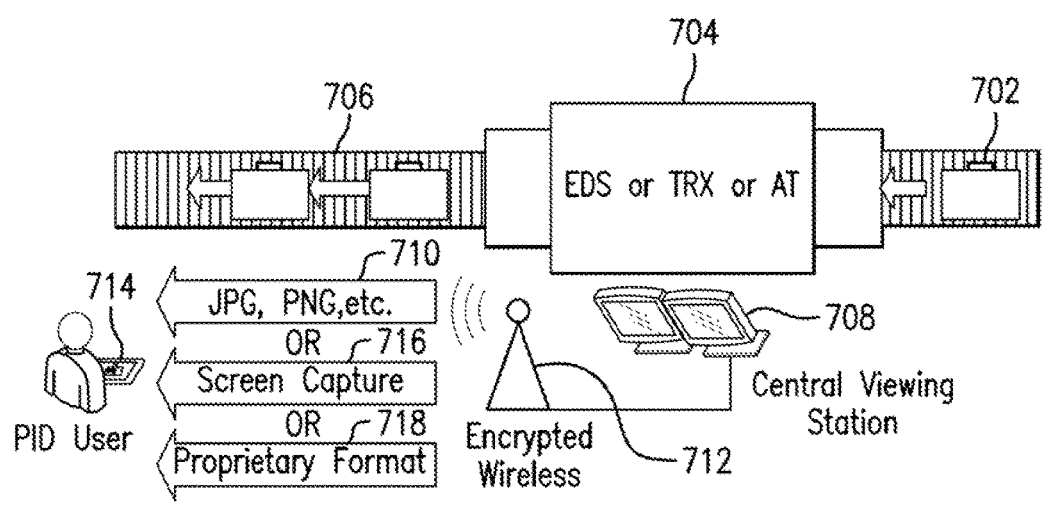
FIG. 7 is an exemplary diagram of an image transmittal of the portable image viewing system.

FIG. 7 is an exemplary illustration of transmitting an image to a PID user 714 in the PIV system. The baggage 702 is scanned while passing through a scanner the exit conveyor 706. The scanner 704 generates images which can be displayed at an existing central viewing monitor 708, but can also be saved as OEM specific files. Most of the OEM specific files include a common readable file of the image 710, such as *.jpg or *.png. The images are transmitted wirelessly through an encrypted wireless network 712. The encrypted wireless network can be implemented through short range wireless encryption or a personal area network.

The scanned image can be transmitted in three different ways to the user of PID 714.

In one embodiment, the image can be transmitted in a common recognizable format 710, such as .jpg, and these images are displayed on the PID 714 with minimal alterations.

In another embodiment, if the scanner 704 cannot generate the images using the common recognizable format, then the viewing station 708 can display the images first and then screen captures of the images can be taken and transmitted to the PID 714.

In another embodiment, OEM may directly save proprietary image files 718 obtained from the scanner and send the proprietary image file 718 to the PID 714.

The image triggering method could eliminate CVS, as the OEM could send the image directly to the PIV, rather than displaying the images on their monitor. A stationary ND can be set up at the CVS, or replace the CVS.

Figure 8:
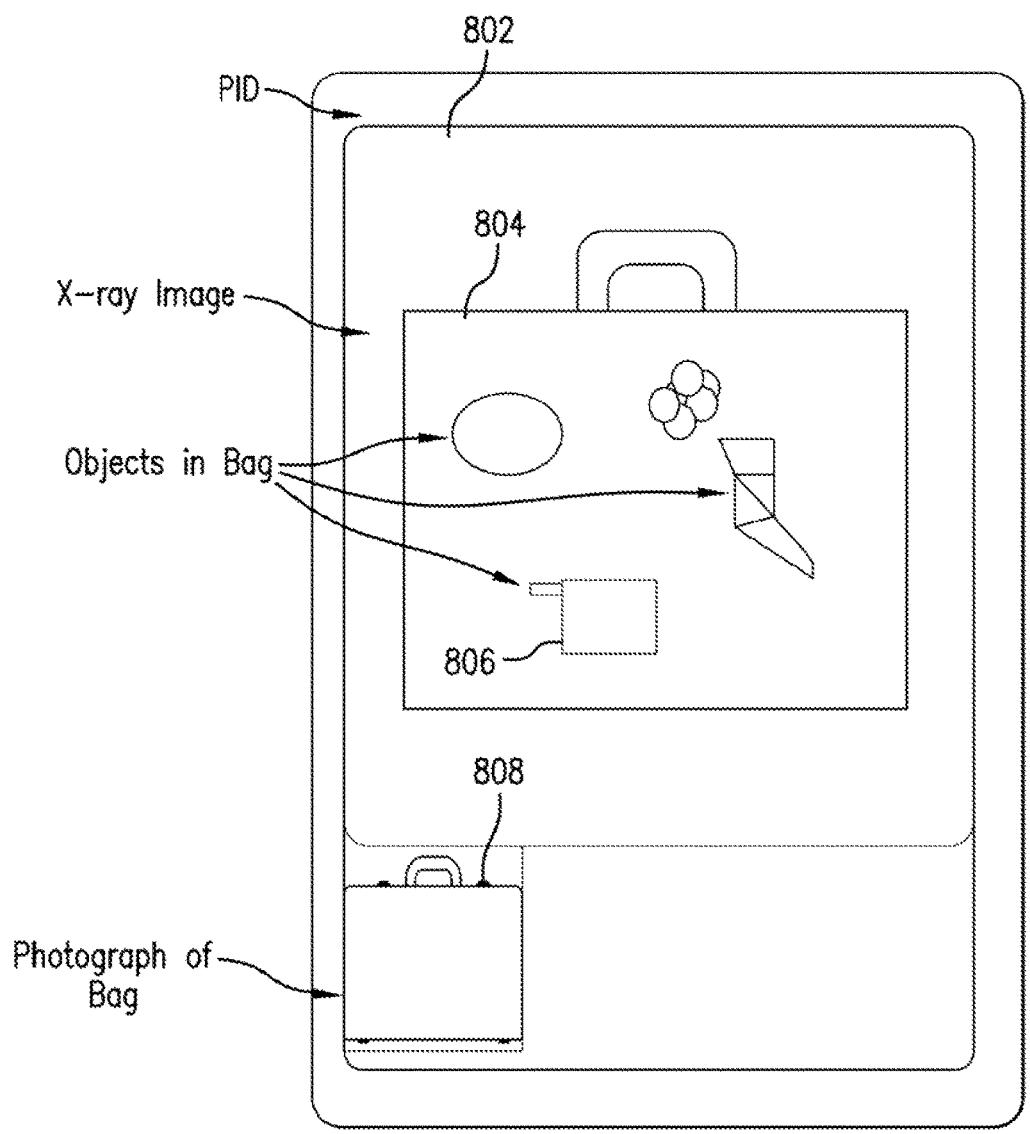
FIG. 8 is an exemplary diagram of a screen of a portable image viewing device with X-ray scanned image and a photograph.

In addition to the scanned images, a photograph of each bag can also be sent to the PID, as shown in FIG. 8. In this exemplary embodiment, cameras are located at the entrance tunnel to the image scanner. The PID with the cameras can also be used to take a photo of the bag. FIG. 8 illustrates how the photograph of the bag can be matched with the scanned images of the bag on the PID. On the screen 802 of the PID, a scanned image 804 of a bag and a photograph 808 of the same bag are shown together. Furthermore, the scanned image 804 also includes objects 806 in the bag. The image of the objects 806 can be further selected and a zoom level of the image increased on the screen 802 of the PID to show details of the objects. According to this method, the scanned image 804 of the bag can be matched with the photograph 808 of the suitcase. For example, if the SO is tasked with screening a pink suitcase and a black suitcase and wishes to observe a scanned image of the pink suitcase, then having both the scanned image and the photograph for the pink suitcase on the screen of the PID enables the SO to confirm that he is indeed looking at the scanned image of the suitcase of interest.

There are various methods which can be implemented according to an embodiment of the disclosure to trigger an image to be displayed onto the PID. One process is to use a time stamp. Each scanned image is immediately sent to every PID. The images displayed on the PID can be automatically progressed from one image to the next based on a predetermined time limit. The image can also be manually progressed from one image to the next based on user decisions (Suspect/Clear). Alternatively, the user can manually move forward or backward to any image they wish to view. If a photograph of the bag is available, the users can use the photograph to confirm that they are observing the objects of interest.

Figure 9:
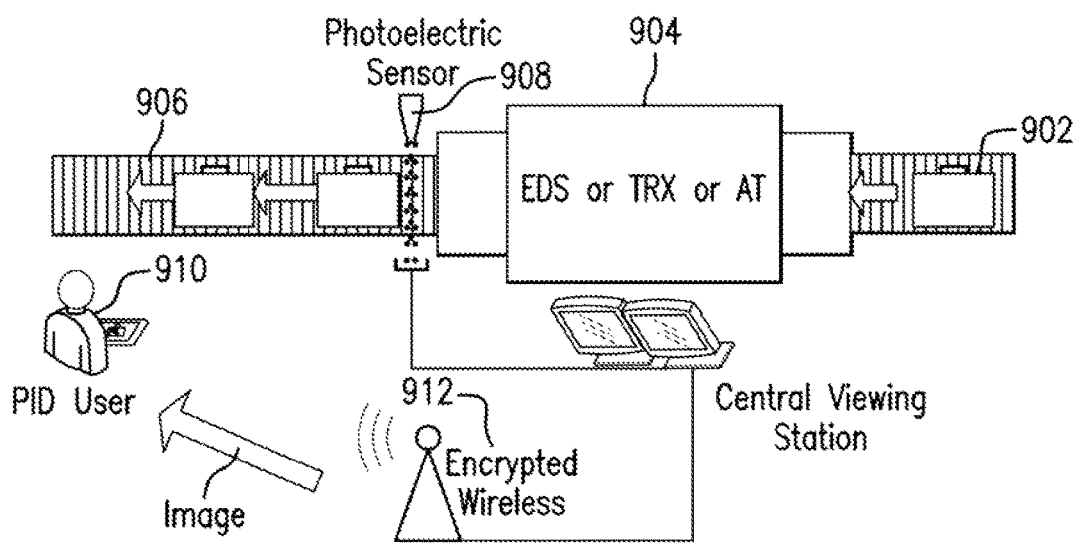
FIG. 9 is an exemplary diagram of a photoelectric sensor image triggering method.

Detected signals from photoelectric sensors can also be used to trigger an image to be displayed onto the PID. The photoelectric sensors are used in many scanners and BI-IS's, to track movement of bags. FIG. 9 is an exemplary illustration of a setup to be used in the photoelectric sensor triggering method. Each bag 902 is scanned by a scanner 904 while passing through the scanning tunnel 906. A photoelectric sensor 908 is installed at the output of the image scanner 904. Each time the scanned bag 902 crosses the photoelectric sensor 908, the scanned image and the photograph of the bag 902 is transmitted to the PID 910 through the encrypted wireless network 912.

A plurality of methods may be additionally implemented according to an embodiment of the disclosure to physically link an RFID and/or Barcode to the physical scanned object. One known process is to attach a tag to the bag to be scanned. Most checked bags are attached with barcode tags at check-in. Some BHS systems have bar code readers to read the attached tags.

Figure 10:
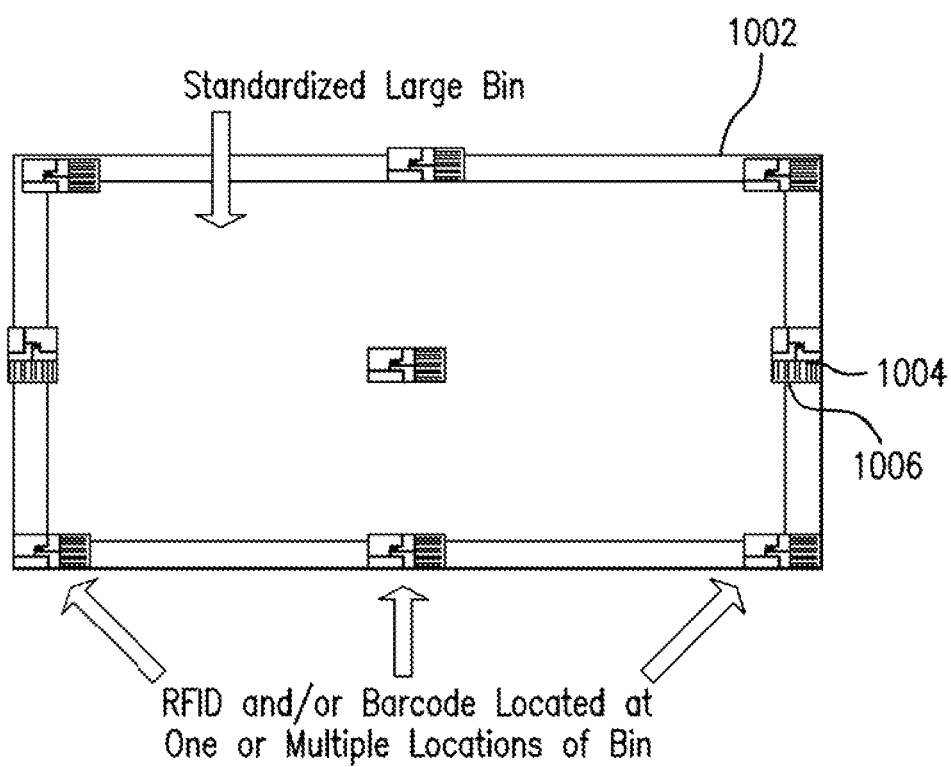
FIG. 10 is an exemplary diagram of a standard bin including RFID or barcodes.

FIG. 10 is an exemplary illustration of a standard bin used at security checkpoints. The standard bin 1002 is used to contain the baggage items during transport via a scanning system. The bin 1002 includes at least one RFID tag or Barcode 1004 located at one or multiple location 1006 of the bin. At a security checkpoint a passenger is typically directed to place every carry-on item to be scanned in a bin. The bins are typically of standard size (approximately 15"W×20"L×5"H) to accommodate any checkpoint or checked baggage items. For instance, in a checkpoint scenario, the bins can be the same size as a standard acceptable carry on item and may be able to assist oversize items.

Barcode or RFID tags can also be incorporated into a boarding pass of the passenger. In this case, the Barcode or RFID tag can be linked to the passenger's items, such as passports, using the tag when the passenger is checked in the airport.

Figure 11:
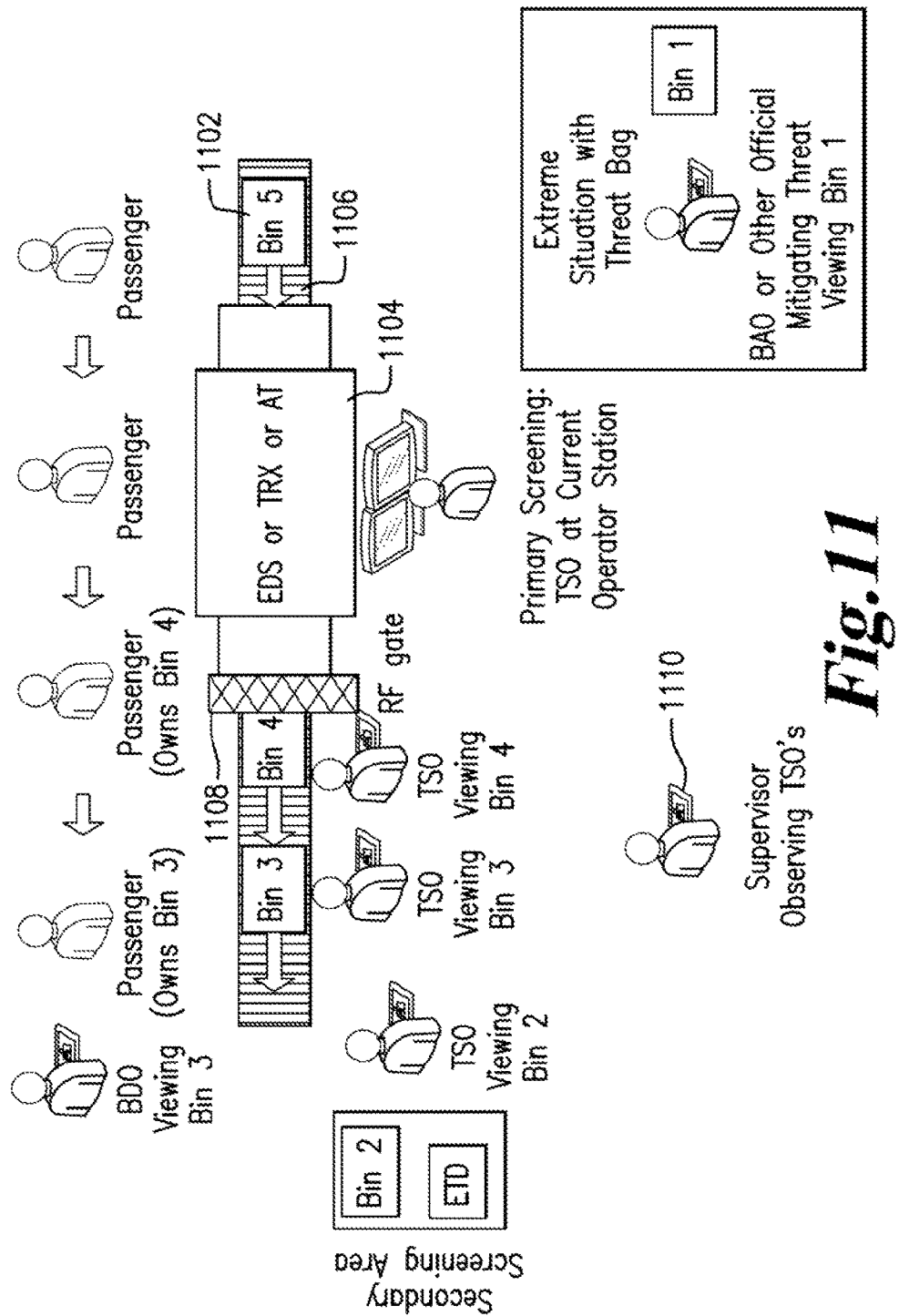
FIG. 11 is an exemplary diagram of a RFID image triggering method.

FIG. 11 is an exemplary illustration of an RFID image triggering method according to an embodiment of the disclosure. Each bag is located in a bin 1102 as illustrated. The bag is scanned by an image scanner 1104 while passing through a scanning tunnel 1106. An RFID gate 1108 is installed at the output of the image scanner 1104. Each time a scanned bag located in the bin 1102 crosses the RF gate 1108, the scanned image and the photograph of the bag is transmitted to the PID 1110. The PID may additionally include an RFID sensor to determine a distance from the PID to the RFID tag on the bin 1102. Therefore, the bag inside the bin 1102 can be located with precision.

By using the RFID image triggering method, the scanner image is associated with each object to be scanned via RFID located on the bin. The scanned image can be replicated onto a portable handheld viewing screen at any location needed. For example, the SO could walk with the PID to any COI and have the scanned image immediately displayed on the PID. Alternatively, the ISO could stay at one location with the PID to inspect the COIs passing by. By using RFID, proximity of the closest COI can automatically cause the projection of the scanned image of that nearest COI onto the screen of the PID.

Figure 12:
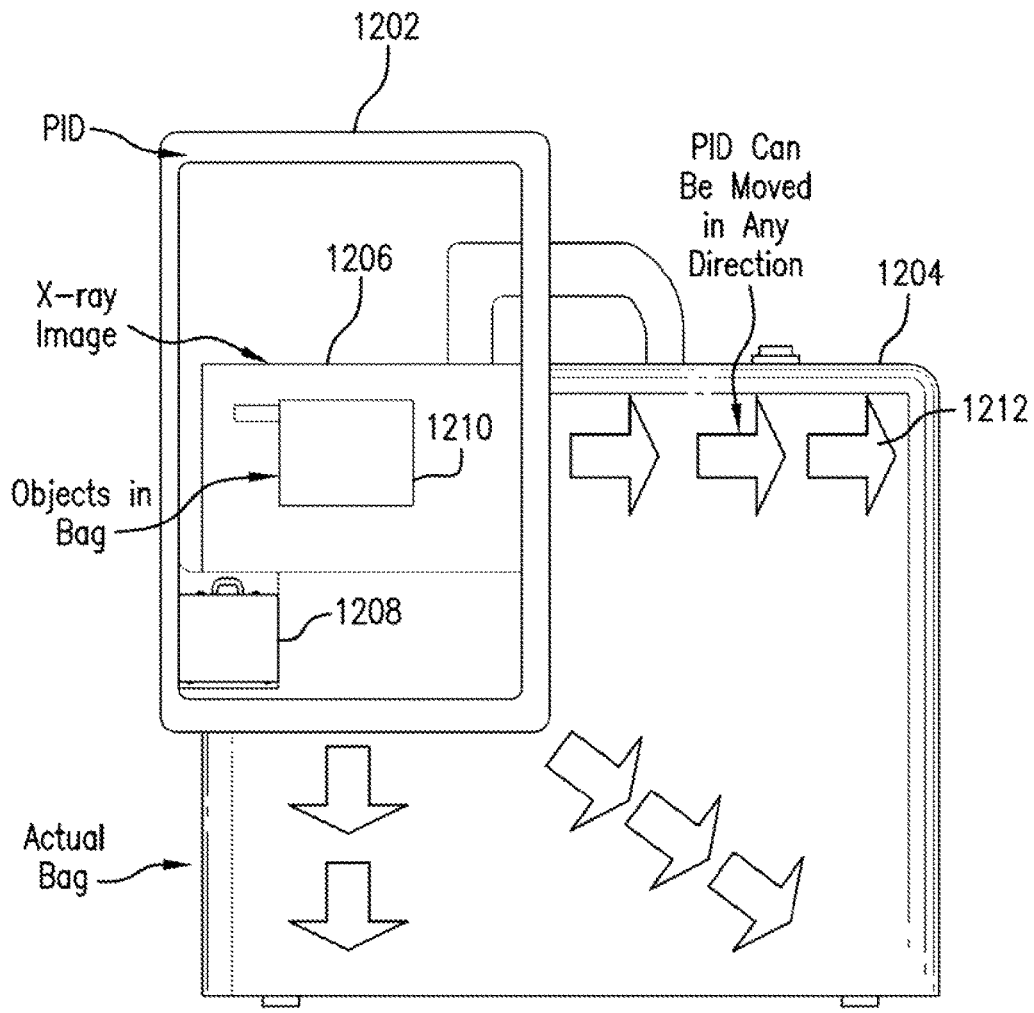
FIG. 12 is an exemplary diagram of an image manipulation by hovering the portable image view device over the inspected item.

Areas of interest of the COI can be zoomed into or rotated. FIG. 12 is an exemplary illustration of scanning the PID 1202 over a bag to inspect the areas of interest. In FIG. 12, the PID 1202 is held close to the actual bag 1204. On the screen 1202 of the PID, a scanned image 1206 and a photograph 1208 of the bag 1204 are displayed. Further, the scanned images of the contents 1210 inside the bag are also displayed on the screen 1204. When the SO hovers (e.g., scans or waves) the PID 1202 over the top right quadrant 1212 of a screening bin, only the top right quadrant of the X-ray image is displayed on the screen 1204. Moreover, the X-ray image can be further zoomed in as the PID 1202 is moved closer to the COI. Secondary searchers can utilize the PID in the same way. This would be of particular interest to the BDO and BAO who in standard security screening systems do not have instant mobile access to the scanner image. For example, the BAO can look at internal areas of interest in a closed bag using the PID without opening or moving the bag, simply by hovering the PID over the area of interest. Image recognition can be used by the PID to automatically match each subject bag in this example, by comparing a scanned image taken by the image scanner or photograph taken when the bag crosses a photoelectric sensor 908, to a live video stream or image taken with a rear camera embedded within the PID.

Bar code scanning could also be used to associate the target object with a scanned image in the same way. The PID can include a rear camera, which can be used as a bar code scanner. When the PID is held near to a bar code tag on a bin, the camera of the PID can scan the barcode, and the scanned image associated with that barcode would be displayed on the PID. In such an embodiment, a bar code reading station or a bar code gate can be installed before, inside, or after the image scanner. Therefore, the image scanned by the image scanner can be correlated to a particular bar code each time that barcode is used to convey baggage through the image scanner.

Figure 13:
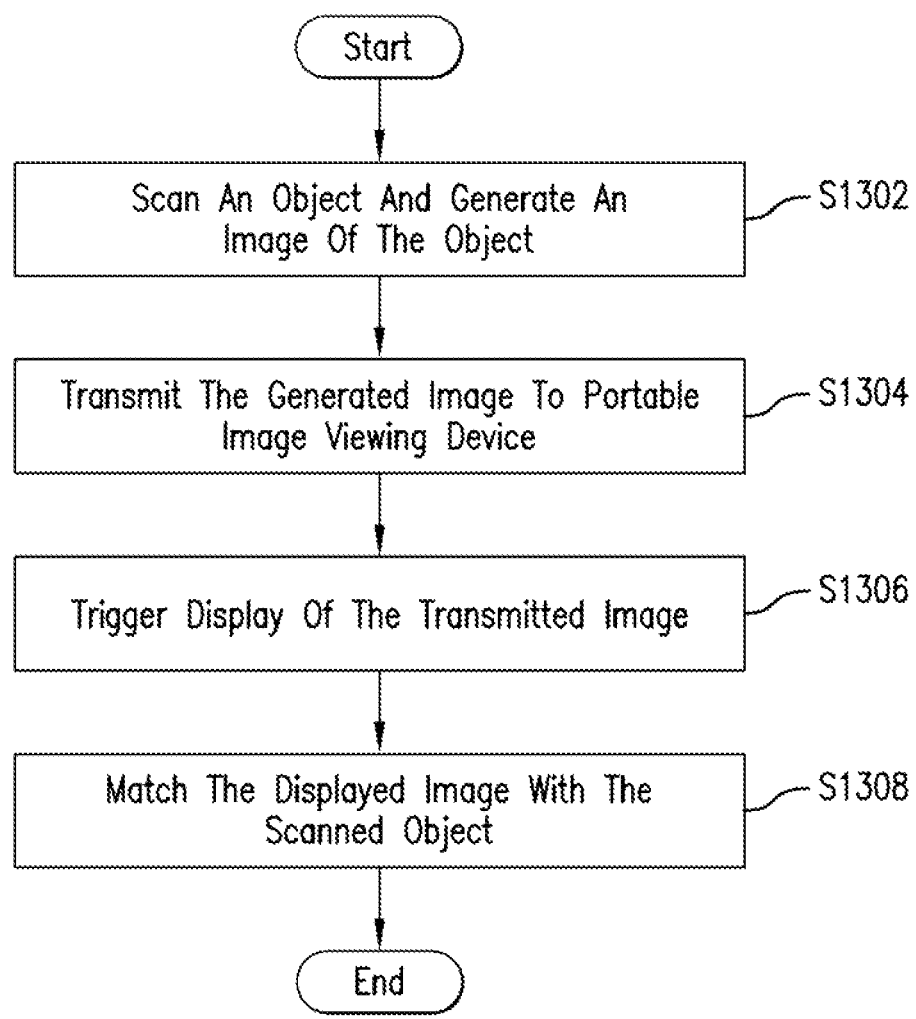
FIG. 13 is an exemplary operation flow chart of the portable image viewing system.

Referring to FIG. 13, a flowchart 300 describes a method for screening images using a PID. In an embodiment, processing circuitry of a controller is located at the central view stations. In another embodiment, the processing circuitry of the controller is located in at least one PID. Further, the locations of the processing circuitry of the controller are interchangeable between the central view stations and the PIDs.

In step S1302, processing circuitry of a controller scans an object and generates an image of the object. The transmitted image is generated by transporting the object through a image scanner such as an X-ray machine. The objects to be scanned can be items, such as checked bags, carried on bags, non-passenger cargo items, or any other items needed to be scanned for security purposes. The objects can also be people, or animals requiring scanning. For example, in an airport environment, passengers have to be scanned in order to get on the plane. The image scanner can be a TRX, an AT, an Auto EDS, a back scatter X-ray scanner or other radiation based screening technology. The image scanner may also include a camera so that a photograph of the item can be taken by the camera, and then transmitted to the PID.

In step S1304, processing circuitry of a controller transmits the generated image to at least one of a plurality of PIDs.

As discussed above, the format of the generated image can include common computer readable files, such as *.jpg or *.png, screen captures of the screening device, or an OEM proprietary image file. The image is transmitted to the PIDs through the encrypted wireless network.

In step S1306, the processing circuitry triggers the transmission of the images to a screen of at least one of the PIDs. The image is displayed on the screen of the PIDs in response to the image triggering mechanism. The applied image trigger mechanism can include time-stamps, an RFID gate, a barcode gate and/or a photoelectric sensor beam as described above. For example, when a time stamp, an RFID signal, a barcode scanning signal, or a photon electric sensing signal are transmitted to the PID, the PID displays the images that correspond to that signal.

In step S1308, the processing circuitry matches the triggered image with the scanned object. The photograph of the scanned object is displayed simultaneously with the X-ray scanned image on the display screen of the PID and can thus help the user of the PID confirm that the X-ray scanned image is the image of the actual object of interest. Further, the PID may further pinpoint the location of objects within a bag using the RFID tags and/or barcodes. Moreover, image manipulation such as that shown in FIG. 12 can be performed on the images using the PID.

Compared with existing screening systems and methods, the disclosed PIV systems and methods require a smaller screening area footprint, provide increased screening accessibility, and result in a faster screening process.

The PIV system and method embodiments disclosed herein can either supplement the viewing station or replace it completely. The existing central viewing stations range in size from 2'×2' workstations to large tables up to 4'×8' and can be over 6' tall. The PIV system can be implemented by handheld tablet computers, and/or smart phones. The smart phones may have a smaller viewing area but are generally more portable than tablet computers. Further, any authorized handheld tablet computers and/or smart phones can be added to the PIV system without building additional stations that would take up valuable footprint space and power at the airport.

Compared with the training needed to use TRX, AT or EDS screening systems, the training to use the PIV system would be a significant advantage because of the intuitiveness of the enhanced functionality of PIV. Currently, image manipulation is performed at the CVS or AVS using specific keypad buttons, which are unique for each OEM of an image scanner. The PIV system includes intuitive image manipulation functions, such as pan and zoom, which can be used in accordance with the movement of the PIV device or by using a touch screen of the PIV device. The same image manipulation functions of the PIV system can be used for X-ray images obtained from different OEMs, thereby reducing the cost and required training. Further, image manipulation features in an existing X-ray system can also be used in PIV systems, such as contrast manipulation.

Moreover, the supervisors of the BDO and SO can use the PIV system to supervise, train and review their subordinates, and emphasize undated search targets. To that end, the supervisors can spot check their subordinates' screen remotely to make sure that SOs are performing adequately. Errors, such as missing prohibited objects or false alarms, can be reduced because of the added redundancy. The supervisors can also point out the updated search targets to the subordinates, and therefore, reinforce the security of the PIV system. Furthermore, the supervisor can provide instant feedbacks to their subordinates and help the subordinates to improve their performance.

The Concept of Operations (CONOPS) for aviation security can be changed to improve efficiency. For instance, an existing staggered approach implemented by assigning two SOs on the same scanning line to scan every other image, and only one image viewed at a time by one of the SOs may improve throughput rates with better detection performance.

Figure 14:
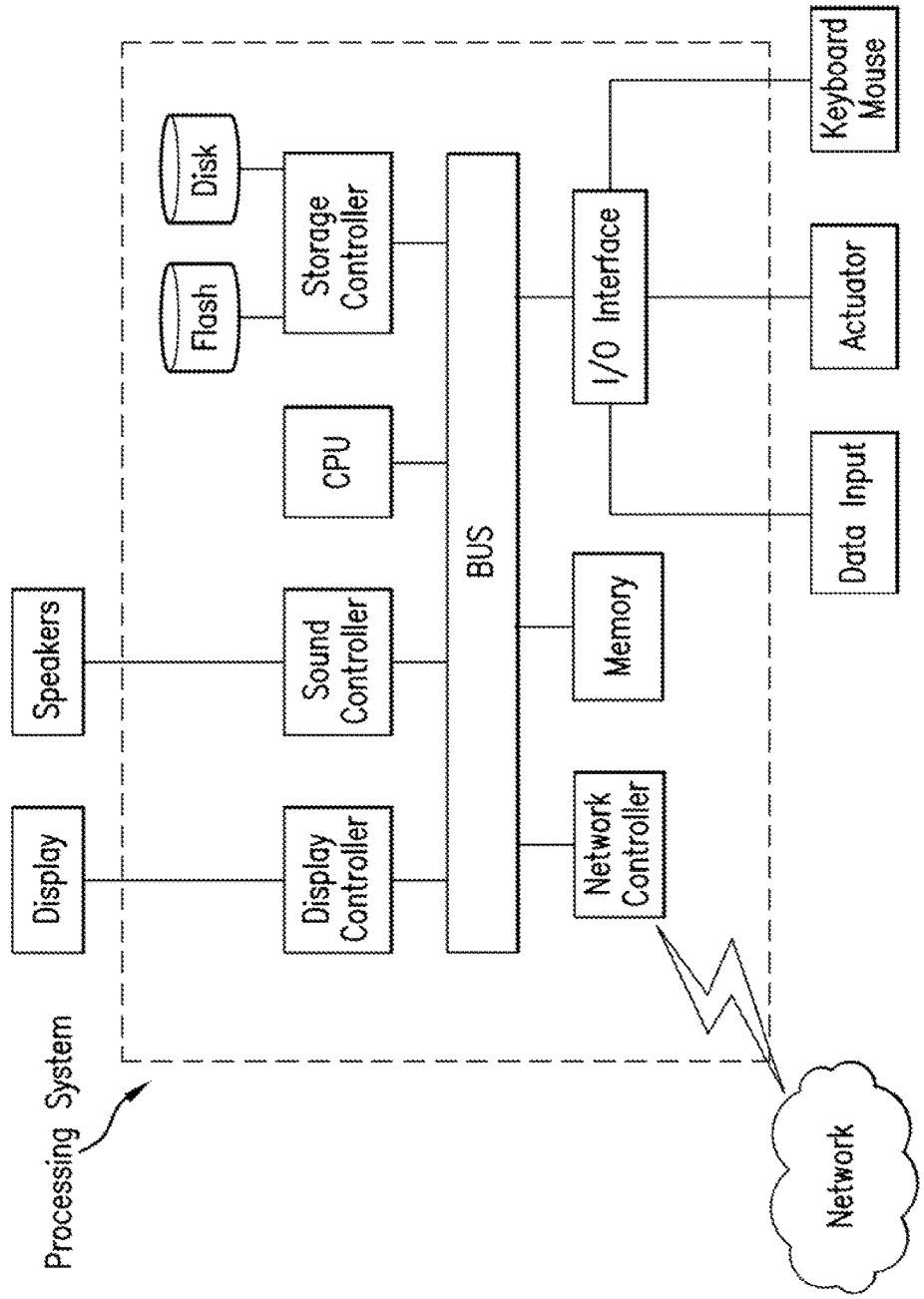
FIG. 14 is an exemplary diagram of processing system.

An exemplary controller is illustrated in FIG. 14, which can include the processing circuitry described for screening, hovering and zooming images on the PID. The processing circuitry can be a hardware device, e.g., a CPU which has been specifically configured to execute one or more computer programs that cause the CPU to perform the described function. In particular, this exemplary processing system can be implemented using one or more microprocessors or the equivalent, such as a central processing unit (CPU) and/or at least one application-specific processor ASP (not shown). A microprocessor is a circuit or circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure, and configured to execute the algorithms described herein. Other storage mediums can be controlled via a controller, such as a disk controller, which can control a hard disk drive or optical disk drive.

The microprocessor or aspects thereof, in alternate implementations, can include or exclusively include a logic device for augmenting or fully implementing aspects of this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU and a graphics processing unit (GPU) to achieve improved computational efficiency. One or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a display of the PID. The display controller preferably includes at least one graphic processing unit, which can be provided by a plurality of graphics processing cores, for improved computational efficiency. Additionally, an I/O (input/output) interface is provided for inputting signals and/or data from microphones, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the display can be provided with a touch-sensitive interface for providing a command/instruction interface.

The above-noted components can be coupled to a network, such as the Internet or a local intranet, via a network interface for the transmission or reception of data, including controllable parameters. A central BUS is provided to connect the above hardware components together and provides at least one path for digital communication there between.

Further, the processing systems, in one implementation, can be connected to each other by a network or other data communication connection. One or more of the processing systems can be connected to corresponding actuators to actuate and control movement of the gantry, and/or the X-ray source.

Suitable software can be tangibly stored on a computer readable medium of a processing system, including the memory and storage devices, such as a non-transitory computer readable medium. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes and complete executable programs. Moreover, parts of the processing of aspects of this disclosure may be distributed for better performance, reliability and/or cost.

The data input portion of the processing system accepts input signals from a detector or an array of detectors by, e.g., respective wired connections. A plurality of ASICs or other data processing components can be provided as forming the Data Input portion, or as providing input(s) to the data input portion. The ASICs can receive signals from, respectively, discrete detector arrays or segments (discrete portions) thereof. When an output signal from a detector is an analog signal, a filter circuit can be provided, together with an analog-to-digital converter for data recording and processing uses. Filtering can also be provided by digital filtering, without a discrete filter circuit for an analog signal. Alternatively, when the detector outputs a digital signal, digital filtering and/or data processing can be performed directly from the output of the detector.

While certain implementations have been described, these implementations have been presented by way of example only, and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

The invention claimed is:

1. An image screening system, comprising:
   an image scanner configured to scan an object to generate a scanned image of the object and configured to photograph the object to generate a photograph of the object, the scanned image corresponding to an interior of the object, the photograph corresponding to an exterior of the object;
   at least one portable image viewing device; and
   a controller including circuitry configured to:
      transmit the scanned image and the photograph to the at least one portable image viewing device;
      trigger display of the scanned image and the photograph corresponding to the object, on a screen of the at least one portable image viewing device, the photograph being displayed at a different scale than the scanned image, the photograph being visible without being overlaid by the scanned image to enable use of the photograph to identify external features of the object not visible in the scanned image to uniquely identify the object relative to other objects that have been scanned;
      match the scanned image with the object by displaying its corresponding scanned image and its corresponding photograph, as selected from a plurality of other scanned images and other photographs taken from a plurality of other objects, such that the scanned image and the photograph match up with the object; and
      trigger display of a subset portion of the scanned image, while displaying an entirety of the photograph, on the screen of the at least one portable image viewing device when the at least one portable image viewing device is held over a subset portion of an exterior of the object, the subset portion of the exterior of the object corresponding to the subset portion of the scanned image, wherein movement of the portable image viewing device toward or away from the exterior of the object automatically adjusts a zooming level of the displayed subset portion of the scanned image.

2. The system of claim 1, wherein the controller is further configured to trigger display of the scanned image using a signal from at least one of a time stamp, a Radio-frequency identification (RFID), a barcode, an infrared sensor, or a photoelectric sensor.

3. The system of claim 1, wherein the circuitry is further configured to locate the object using a Radio-frequency identification (RFID), and in response to locating the object:
   identify and trigger display of the scanned image corresponding to the object from among a plurality of other scanned images corresponding to other objects already scanned;
   identify and trigger display of the photograph corresponding to the object from among a plurality of other photographs corresponding to other objects already photographed; and
   identify and trigger display of a distance to the object from the controller.

4. The system of claim 1, wherein the image scanner is at least one of an X-ray computed tomography scanner, a threat image projection enabled X-ray scanner, an advanced technology X-ray scanner, an automated Explosive Detection X-ray scanner, a backscatter X-ray scanner, or a millimeter wave based whole body image scanner; and wherein the scanner accommodates the object to be scanned directly, or accommodates the object to be scanned in a bin including at least one of an RFID tag or a barcode to establish the position of the object via the bin.

5. The system of claim 1, wherein the circuitry is configured to trigger the display of the subset portion of the scanned image by comparing the photograph with at least one of a video of the object or an image of the object taken by the at least one portable image viewing device.

6. The system of claim 1, wherein the circuitry is configured to receive a selection of an item of interest depicted in the scanned image corresponding to the interior of the object, and automatically increase the zooming level of the displayed subset portion of the scanned image to show details of the selected item of interest.

7. The system of claim 1, further comprising a camera associated with the image scanner that is configured to take the photograph of the exterior of the object during scanning of the object to generate the scanned image, wherein the circuitry is further configured to display simultaneously on the at least one portable image viewing device the scanned image corresponding to the interior of the object and the photograph of the exterior of the object.

8. The system of claim 1, wherein the circuitry is further configured to transmit the scanned image to the at least one portable image viewing device through an encrypted wireless network.

9. An image matching system comprising:
at least one portable image viewing device; and
a controller including circuitry configured to:
transmit a scanned image of an object and a photograph of the object to the at least one portable image viewing device, the scanned image corresponding to an interior of the object, and the photograph corresponding to an exterior of the object;
trigger display of the scanned image and the photograph corresponding to the object, on a screen of the at least one portable image viewing device, the photograph being displayed at a different scale than the scanned image, the photograph being visible without being overlaid by the scanned image to enable use of the photograph to identify external features of the object not visible in the scanned image to uniquely identify the object relative to other objects that have been scanned;
match the scanned image with the object by displaying its corresponding scanned image and its corresponding photograph, as selected from a plurality of other scanned images and other photographs taken from a plurality of other objects, such that the scanned image and the photograph match up with the object; and
trigger display of a subset portion of the scanned image, while displaying an entirety of the photograph, on the screen of the at least one portable image viewing device when the at least one portable image viewing device is held over a subset portion of an exterior of the object, the subset portion of the exterior of the object corresponding to the subset portion of the scanned image, wherein movement of the portable image viewing device toward or away from the exterior of the object automatically adjusts a zooming level of the displayed subset portion of the scanned image.

10. The system of claim 9, wherein an image scanner scans the object and generates the scanned image of the object, and the image scanner includes at least one of an X-ray computed tomography scanner, a threat image projection enabled X-ray scanner, an advanced technology X-ray scanner, an automated explosive detection X-ray scanner, a backscatter X-ray scanner, or a millimeter wave scanner; and wherein the scanner accommodates the object to be scanned directly, or accommodates the object to be scanned in a bin including at least one of an RFID tag or a barcode to establish the position of the object via the bin.

11. The system of claim 9, wherein the circuitry is further configured to trigger display of the scanned image using a signal from at least one of a time stamp, a Radio-frequency identification (RFID), a barcode, an infrared sensor, or a photoelectric sensor.

12. The system of claim 9, wherein the circuitry is further configured to locate the object using a signal from a Radio-frequency identification (RFID), and in response to locating the object:
identify and trigger display of the scanned image corresponding to the object from among a plurality of other scanned images corresponding to other objects already scanned;
identify and trigger display of the photograph corresponding to the object from among a plurality of other photographs corresponding to other objects already photographed; and
identify and trigger display of a distance to the object from the controller.

13. The system of claim 9, wherein the circuitry is configured to trigger the display of the subset portion of the scanned image by comparing the photograph with at least one of a video of the object or an image of the object taken by the at least one portable image viewing device.

14. The system of claim 9, wherein the circuitry is configured to receive a selection of an item of interest depicted in the scanned image corresponding to the interior of the object, and automatically increase the zooming level of the displayed subset portion of the scanned image to show details of the selected item of interest.

15. The system of claim 9, further comprising a camera configured to take the photograph of the exterior of the object during scanning of the object to generate the scanned image, wherein the circuitry is further configured to display simultaneously on the at least one portable image viewing device the scanned image corresponding to the interior of the object and the photograph of the exterior of the object.

16. The system of claim 9, wherein the circuitry is further configured to transmit the scanned image to the at least one portable image viewing device through an encrypted wireless network.

17. An image screening method, comprising:
scanning an object to generate a scanned image of the object, the scanned image corresponding to an interior of the object;
photographing the object to generate a photograph of the object, the photograph corresponding to an exterior of the object;
transmitting the scanned image and the photograph to at least one portable image viewing device;
triggering display of the scanned image and the photograph corresponding to the object, on a screen of the at least one portable image viewing device, the photograph being displayed at a different scale than the scanned image, the photograph being visible without being overlaid by the scanned image to enable use of the photograph to identify external features of the object not visible in the scanned image to uniquely identify the object relative to other objects that have been scanned;
matching the scanned image with the object by displaying its corresponding scanned image and its corresponding photograph, as selected from a plurality of other scanned images and other photographs taken from a plurality of other objects, such that the scanned image and the photograph match up with the object; and
triggering display of a subset portion of the scanned image, while displaying an entirety of the photograph, on the screen of the at least one portable image viewing device when the at least one portable image viewing device is held over a subset portion of an exterior of the object, the subset portion of the exterior of the object corresponding to the subset portion of the scanned image, wherein movement of the portable image viewing device toward or away from the exterior of the object automatically adjusts a zooming level of the displayed subset portion of the scanned image.

18. The method of claim 17, wherein the scanning is accomplished using an image scanner including at least one of an X-ray computed tomography scanner, a threat image projection enabled X-ray scanner, an advanced technology X-ray scanner, an automated explosive detection X-ray scanner, a backscatter X-ray scanner, or a millimeter wave scanner; and wherein the scanner accommodates the object to be scanned directly, or accommodates the object to be scanned in a bin including at least one of an RFID tag or a barcode to establish the position of the object via the bin.

19. The method of claim 17, wherein the triggering the display of the scanned image comprises triggering the display of the scanned image using a signal from at least one of a time stamp, a Radio-frequency identification (RFID), a barcode, an infrared sensor, or a photoelectric sensor.

20. The method of claim 17, further comprising locating the object using a signal from radio-frequency identification (RFID) and in response to locating the object:

identifying and triggering display of the scanned image corresponding to the object from among a plurality of other scanned images corresponding to other objects already scanned;
identifying and triggering display of the photograph corresponding to the object from among a plurality of other photographs corresponding to other objects already photographed; and
identifying and triggering display of a distance to the object from the controller.

21. The method of claim 17, wherein the display of the subset portion of the scanned image is triggered by comparing the photograph with at least one of a video of the object or an image of the object taken by the at least one portable image viewing device.

22. The method of claim 17, further comprising:
receiving a selection of an item of interest depicted in the scanned image corresponding to the interior of the object, and;
automatically increasing the zooming level of the displayed subset portion of the scanned image to show details of the selected item of interest.

23. The method of claim 17, further comprising taking the photograph of the exterior of the object during scanning of the object to generate the scanned image, and displaying simultaneously on the at least one portable image viewing device the scanned image corresponding to the interior of the object and the photograph of the exterior of the object.

* * * * *